United States Patent [19]
Hisano et al.

[11] 4,083,819
[45] Apr. 11, 1978

[54] PROCESS FOR PREPARING PREPOLYMERS OR PRECOPOLYMERS OF DIALLYL PHTHALATE IN A SOLID STATE

[75] Inventors: Akio Hisano, Yao; Shohachi Ogura; Kouji Satomo, both of Amagasaki, all of Japan

[73] Assignee: Osaka Soda Co. Ltd., Osaka, Japan

[21] Appl. No.: 724,092

[22] Filed: Sep. 17, 1976

[51] Int. Cl.$^2$ .................................................. C08F 6/10
[52] U.S. Cl. ............................ 260/2.5 R; 260/32.8 R; 526/322; 528/483; 528/495; 528/496; 528/498
[58] Field of Search ............... 526/322; 528/483, 495, 528/496, 498; 260/2.5 R

[56] References Cited
U.S. PATENT DOCUMENTS 2,612,492  9/1945  Tawney .............................. 260/78.5
3,424,729  1/1969  Lanaka et al. ...................... 260/78.4

*Primary Examiner*—Stanford M. Levin
*Attorney, Agent, or Firm*—Sherman & Shalloway

[57] ABSTRACT

An improved process for preparing prepolymers or precopolymers of diallyl phthalate in a solid state from a prepolymer or precopolymer phase separated by the liquid phase extraction in a liquid state of fluidity and containing 10–30% by weight of the extractant, which comprises forming the prepolymer or precopolymer phase in a liquid state of fluidity and containing the extractant into a sheetlike form prior to solidifying it by cooling, heating prepolymer or precopolymer phase under foaming conditions accompanied by the evaporation of the extractant, and thereafter solidifying the prepolymer or precopolymer.

5 Claims, No Drawings

PROCESS FOR PREPARING PREPOLYMERS OR PRECOPOLYMERS OF DIALLYL PHTHALATE IN A SOLID STATE

This invention relates to an improved process whereby prepolymers or precopolymers of diallyl phthalate in a solid state can be prepared with a simple and compact apparatus and an easy process with a markedly reduced drying time without setting up an objectionable heat-polymerization of these prepolymers or precopolymers and, in addition, wherein the resulting prepolymers or precopolymers can be readily rendered into such forms as free-flowing powders, flakes, granules or the like and the product can be obtained as porous solids having superior solubility.

The prepolymers or precopolymers of diallyl phthalates (unless otherwise specified, the term "prepolymers or copolymers", as used hereinafter, denotes those of diallyl phthalates) are thermoplastic polymers with relatively low molecular weights having unsaturated residue groups, and when further polymerized, tend to form a rigid, cross-linked structure. These polymers or copolymers are obtained by the addition polymerization of the monomers of tetrafunctional diallyl phthalates having two polymerizable double bonds (unless otherwise specified, the term "monomers", as hereinafter used, denotes those of diallyl phthalates, including other compounds that are copolymerizable therewith, when they are used as comonomers). These prepolymers or precopolymers, singly or in blends with other resins, are used in moldings, laminates, coatings. etc. Particularly, due to their excellent physical and chemical properties including heat resistance, electrical properties and chemical resistance, they find application in extremely diversified fields. The use of these prepolymers or precopolymers offers many advantages such as ease of handling, reduced curing time, smaller shrinkage in final cure and stability, as compared with the case where the corresponding monomers are employed.

In general uses, the prepolymers or precopolymers are desired to be in various solid forms including free-flowing powders, flakes or granules from the standpoint of handling, storage and application.

Since the monomers of diallyl phthalates are tetrafunctional material with two polymerizable double bonds, they often become gelled in the polymerization reaction due to the relatively low conversion rate. The term "gelation", as herein used, means that upon polymerization of polyfunctional monomers such as those of diallyl phthalates, thermoplastic prepolymers or precopolymers with relatively low molecular weights are primarily produced which contain polymerizable unsaturated residue groups, and that upon further polymerization, the polymerized system passes the stage of such prepolymers or precopolymers and takes the form of solid non-fluid, insoluble, infusible polymers with a net-like construction. When such gelation takes place, the polymer no longer becomes soluble in common solvents and thermoplastic, so that it ceases to be what we desire. Therefore to obtain prepolymers or precopolymers, it is necessary to stop the polymerization at least immediately before gelation occurs. The polymerized mixture, which has ceased to be polymerized immediately before gelation contains not only prepolymers or precopolymers but also considerable quantities of the unreacted monomers thereof. In some cases the mixture contains liquid reaction media.

The main bottle neck in the manufacture of prepolymers or precopolymers lies in separating the same in a non-viscous solid powdered form from the polymerization product solution which contains large amounts of unreacted monomers as above described. For instance, even in the case where prepolymers or precopolymers having relatively high molecular weights are to be separated, if an extractant which is a non-solvent for the prepolymers or precopolymers but a solvent for the monomers thereof is added to the polymerization product solution to precipitate the prepolymers or precopolymers and separate the monomers, the prepolymers or precopolymers generally settle as viscous lumps, in which the monomers still remain occluded. Consequently, it is extremely difficult to remove these monomers from the lumps, even by their treatment with the conventional apparatuses. This is predominantly the case with the manufacture of particularly those prepolymers or precopolymers with relatively low molecular weights which are thermoplastic and easily melted. Thus the separation of such polymers is accompanied with great difficulties.

Thus, in the manufacture of the prepolymers or precopolymers of diallyl phthalates considerable difficulties have been experienced in separating these prepolymers or copolymers from the resulting polymerization product solution containing unreacted monomers due to technical shortcomings and, consequently, it has been strongly desired all along to obtain with commercial advantage these prepolymers or precopolymers in the form of a nonviscous solid powder.

In order to satisfy the foregoing desire, there has been suggested a process for the liquid phase separation of the prepolymers or precopolymers of diallyl phthalate which comprises separating said prepolymers of precopolymers from the polymerization product solution containing the corresponding unreacted monomers by using as an extractant a nonreactive organic solvent which is a solvent for said monomers but non-solvent for said prepolymers or precopolymers. This process is characterized by carrying out a liquid-liquid extraction at temperatures of at least 10° C. and capable of maintaining both said prepolymers or precopolymers and said extract out in a liquid state of free fluidity to divide said polymerization product solution into two liquid phases: (1) the extractant phase containing said unreacted monomers and (2) the prepolymer or precopolymer phase containing said extractant (U.S. Pat. No. 3,424,729).

The prepolymer or precopolymer phase in a liquid state of fluidity separated by the liquid phase extraction in accordance with the foregoing suggestion from the polymerization product solution containing a prepolymer or precopolymer of diallyl phthalate and the corresponding unreacted diallyl phthalate monomer using as the extractant a nonreactive organic solvent which is a solvent for the diallyl phthalate but a non-solvent for the prepolymer or precopolymer usually contains about 10 – 30% by weight of the extractant based on the prepolymer or precopolymer phase. In the foregoing suggestion, in obtaining the prepolymers or precopolymers of diallyl phthalate in a solid state from the aforementioned prepolymer or precopolymer phase in a liquid state of fluidity, this prepolymer or precopolymer phase in a liquid state of fluidity is formed into a solid lump by cooling followed by crushing and drying, or said phase is poured onto rolls which have been previously water-cooled and is subjected to cooling and rolling and, at the same time, the extractant contained is squeezed out, after which the solid prepolymer or precopolymer thus rolled is dried.

The solid product obtained in the foregoing drying operation by cooling and solidifying the prepolymer or precopolymer phase in a liquid state of fluidity and containing 10 – 30% by weight of the extractant based on the prepolymer or precopolymers still contains a considerable amount of the extractant even though it has been subjected to rolling and squeezing. Since this type of extractant-containing solidified prepolymer or precopolymer softens at a temperature lower than the inherent softening point of said prepolymer or precopolymer, its drying is carried out at this low temperature. Now, since this temperature is lower than the boiling point of the extractant, there is the disadvantage from the commercial standpoint that this drying step becomes a time consuming operation requiring a long period of time. On the other hand, when attempts are made to avoid this disadvantage by using higher temperatures for drying the cooled hardened particles, there is the drawback that fusion of the extractant-containing particles tends to take place.

We engaged in researches with a view to solve the foregoing technical difficulties present in the prior art in preparing prepolymers or precopolymers in a solid state in the form of free-flowing powders, flakes, granules or the like by drying the prepolymer or precopolymer phase separated by the liquid phase extraction in a liquid state of fluidity and containing an extractant.

In consequence, we found that the foregoing technical difficulties could be completely solved by completely departing from the technical concept and means of the prior art which involved cooling the product for its solidification and thereafter drying it and instead adopting a procedure consisting of causing the prepolymer or precopolymer phase in a liquid phase of fluidity and containing the extractant, prior to its being cooled for solidification, to flow onto, say, a conveyor belt into sheet form in a liquid state and heating this sheet under foaming conditions accompanied by the evaporation of the extractant contained in said phase and thereafter solidifying the sheet. It was further found that a superior drying action and effects could be achieved as a result of the setting up of a foaming phenomenon by the evaporation of the extractant by application of heat in that the resulting solidified product becomes a porous solid of sheet form, with the consequence that not only the product has improved solubility but also the removal of the extractant is fully accomplished in an exceedingly short period of time and, in addition, the setting up of heat-polymerization of the prepolymers or precopolymers by heat can be substantially and completely avoided. We also found that since the solidification takes place subsequent to the heat treatment under foaming conditions accompanied by the evaporation of the extractant it was possible to prepare prepolymer or precopolymers of diallyl phthalate in a solid state and in the form of free-flowing powders, flakes, granules or the like by an easy procedure and with a simple and compact apparatus without the occurrence of a troublesome fusion at the time of drying the product after its solidification as in the case with the conventional methods.

It is therefore an object of this invention to provide a markedly improved process for preparing prepolymers or precopolymers of diallyl phthalate in a solid state from a prepolymer or precopolymer phase separated by the liquid phase extraction in a liquid state of fluidity and containing 10 – 30% by weight of the extractant.

The foregoing object and many other objects and advantages of the present invention will become apparent from the following description.

The prepolymer or precopolymer phase in a liquid state of fluidity and containing 10 – 30% by weight of the extractant based on the prepolymer or precopolymer phase can be obtained by the liquid phase extraction as described in, say, the aforementioned U.S. Pat. No. 3,424,729 from the polymerization product solution containing a prepolymer or precopolymer of diallyl phthalate and the corresponding unreacted diallyl phthalate monomer, using as extractant a nonreactive organic solvent which is a solvent for the diallyl phthalate monomer but a nonsolvent for the prepolymer or precopolymer of the diallyl phthalate. Since the liquid phase extraction procedure has been fully described in the foregoing U.S. Pat. No. 3,424,729, it will only be described briefly herein to avoid redundancy.

According to the invention process, the liquid phase extraction may be the liquid-liquid extraction procedure described in the foregoing U.S. patent or it may be a liquid-solid extraction procedure depending upon the amount of the extractant used and the extraction temperature. In the latter case, the separated prepolymer or precopolymer phase in a solid state and containing 10 – 30% by weight of the extractant can be readily rendered into a prepolymer or precopolymer phase in a liquid state of fluidity such as a flowable paste and containing 10 – 30% by weight of the extractant by application of heat and can be utilized in like manner in the process of the present invention.

The term "diallyl phthalate", as used herein, is meant to include the ortho-, iso- and terediallyl phthalates, and the homo- or coprepolymers of these can be used. On the other hand, as the precopolymers included are those of copolymers of one or more of the foregoing diallyl phthalates with copolymerizable unsaturated compounds other than the diallyl phthalates. As the unsaturated compound monomer, there can be mentioned such compounds as, for example, triallyl cyanurate, styrene, methyl methacrylate and triallyl phosphene. On the other hand, as the aforementioned extractants, there can be mentioned the $C_1$ – $C_6$ aliphatic alcohols and the $C_5$ – $C_8$ aliphatic hydrocarbons, examples of which are methanol, ethanol, propanol, butanol, pentane, hexane and heptane.

The viscosity of the prepolymer or precopolymer phase in a liquid state of fluidity to be heat-treated under foaming conditions accompanied by the evaporation of the extractant is preferably about 3,000 – 100,000 centipoises.

The amount of extractant to be used is suitably chosen in accordance with the class of the extractant, the extraction temperature, the polymerization rate of the prepolymer or precopolymer and the number of times the extraction is to be performed. For instance, in the case of a liquid-phase liquid phase extraction, the extractant is preferably used in an amount of usually about 2 to about 4 times by weight of the polymerization product solution in the first round of the extraction, and about 2.5 to about 8 times by weight of the polymerization product solution in the second and subsequent rounds. While the extraction temperature is varied in accordance with the class of extractant used, the polymerization rate of the prepolymer or precopolymer and the number of times the extraction is to be performed, usually preferred is a temperature below the boiling point of the extractant, a temperature of about 30° to about 70° C. being suitable, say, in the case of the liquid phase-liquid phase extraction. Since the amount contained of the monomer is less in the second and subsequent rounds, the extraction is best performed at higher temperatures.

In the invention process the prepolymer or precopolymer phase in a liquid state of fluidity and containing 10 – 30% by weight of the extractant based on the prepolymer or precopolymer phase obtained as above described, before being solidified by cooling, is rendered into sheet form in a liquid state such as a pasty liquid state of fluidity and heated in this form under conditions of foaming accompanied by evaporation of the extractant. Since the foregoing prepolymer or precopolymer phase in a liquid state of fluidity contains 10 – 30% by weight of the extractant, its liquid state of fluidity is maintained at a temperature of about 45° to about 70° C. In the invention process, as indicated hereinabove, this prepolymer or precopolymer phase is heated under the foaming conditions indicated above before being solidified by cooling. Any procedure may be employed for spreading the prepolymer or precopolymer phase into sheet form. For instance, the free-flowing prepolymer or precopolymer phase, which leaves the extractor after completion of the liquid phase extraction operation, is formed into a thin sheet by, say, rolls, a knife or a T-die and is conveyed onto, say, a horizontal endless belt conveyor and heated. After having undergone the heating, drying and cooling, the dried and solidified prepolymer of sheet form becomes stripped from the belt conveyor as the latter rotates away from the prepolymer sheet. Thus is obtained a dried product. Alternately, it is also possible to employ a procedure in which the prepolymer of sheet form is stripped from the belt conveyor after heating and drying but before its cooling and solidification, following which the stripped sheet is solidified by cooling. The so obtained sheet can then be comminuted and rendered into such forms as powders or flakes, as desired. In forming the prepolymer or precopolymer phase into sheet form on the belt conveyor, either rolling with rolls or extruding through a T-die is suitably used in the case where the viscosity of the prepolymer phase is relatively high. However, in the case where the viscosity is small, a procedure consisting of applying the prepolymer phase onto the surface of the belt conveyor with a continuous coating apparatus can also be employed.

As previously indicated, the heating is carried out under such conditions as will set up a foaming phenomenon accompanied by evaporation of the extractant contained in the prepolymer or precopolymer phase of sheet form in a liquid state formed as hereinbefore described. Usually, a temperature at which the heat-polymerization of the prepolymer or precopolymer is not set up, i.e., one up to about 140° C. or higher, can be employed. For example, most frequently employed is a temperature in the range of about 50° to about 140° C. This heating temperature can be suitably decided in accordance with the class of the extractant, its content, thickness of the sheet, drying time, etc. The thickness of the prepolymer or precopolymer phase sheet in the liquid state is suitably about 3 millimeters or less, most frequently used being, say, about 0.5 millimeter to about 2 millimeters. The surface that supports the sheet, e.g., the surface of a belt conveyor, should preferably be of such a material as will permit the sheet to be easily stripped from the surface after its heating and drying. For example, preferred as the supporting surface are those formed of such materials as the fluorine resins or rubber, e.g., poly(polyfluoroethylene) resins, poly(fluorochloroethylene) resins, poly(fluorinated vinylidene) resins, poly(fluorinated vinyl) resins, and the copolymeric resins thereof, or the silicon resins or rubber, e.g., organopolysiloxane, or those whose surface has been coated with these materials.

The heat-treatment zone should preferably be one which is substantially closed so as to permit the collection and recovery of the extractant. The heating means can be optionally chosen. For example, any of such means as hot air heating, infrared heating, electric heating or any other heating means may be employed. These may be used alone, or two or more classes of these heating means may be used in combination. The drying time can be suitably chosen in accordance with the class of the extractant, the thickness of the sheet, the heating temperature and other conditions. For example, the drying operation is best carried out so that the desired foaming and drying is completed in about 2 – 10 minutes. After the heating and drying treatment, the sheet is left to stand until it is cooled and solidified, or its cooling may be accomplished by positive means. There is imposed no particular restriction as to the cooling means itself, and its choice is optional. However, the cold air fan is preferred from the standpoint of ease of operation. Cold air may be blown against one side or both sides of the sheet. The cooled and solidified prepolymer or precopolymer of diallyl phthalate in a solid state is in a porous state as a result of its heating and drying under foaming conditions accompanied by evaporation of the extractant. Hence, it can be readily comminuted by any of such means as crushing, as required. Thus, it is possible according to the invention process to readily obtain porous free-flowing powders, flakes, granules or the like of excellent solubility with an exceedingly reduced drying time. Moreover, the various foregoing functions and effects can be achieved without setting up an objectionable heat-polymerization of the prepolymers or precopolymers or diallyl phthalate. Further, the invention process can be carried out with a simple and compact drying apparatus with better extractant removal efficiency, with the consequence that outstandingly improved effects are obtained in preparing prepolymers or precopolymers of diallyl phthalate in the form of free flow powders, flakes, granules or the like on a commercial scale.

The following examples will serve to more fully illustrate several modes of practicing the invention process.

EXAMPLE 1

One hundred parts (unless otherwise specified, the parts in this and the subsequent examples are on a weight basis) of an unreacted monomer-containing polymerization product solution containing 25% of orthodiallyl phthalate prepolymer and as extractant 200 parts of isopropyl alcohol were combined, and the extraction was carried out with stirring for 5 minutes at 50° C. and an rpm of 200. On stopping the stirring, the extraction system immediately separated into two liquid phases. The supernatant liquid predominantly of isopropyl alcohol and monomer was removed by decantation and filtration. 250 parts of isopropyl alcohol was then added anew to the bottom phase extract residue predominantly of prepolymer, and the extraction was carried out with stirring for 5 minutes at 70° C. for the second time. On stopping the stirring, the extraction system immediately separated into two liquid phases (at this time the whole system was a free-flowing liquid). The bottom prepolymer phase in a liquid state of fluidity (isopropyl alcohol content 20% by weight) was withdrawn from the bottom and caused to flow between a pair of vertically disposed rolls, both of which had been preheated to 60° – 65° C. The top roll (outside diameter 100 mm, length 600 mm) was secured idly, while the bottom (outside diameter 200 mm, length 600 mm) was driven by a belt. As a result of the passage of the prepolymer through this pair of rolls, it was rendered into a uniform sheetlike material having a thickness of 1.0 mm and a width of 400 mm. The sheetlike material leaving the rolls was received onto a belt conveyor (a flow glass belt of a fluorinated resin type material having a width of 500 mm and a length of 12 meters manufactured by Dodge Fibers Co., Ltd., Japan; speed of belt 1 meter per minute) and passed through a hot air oven (length 6 meters) of 100° C. In this oven the sheetlike material was dried for 6 minutes by heating it under foaming conditions by causing hot air to flow at a velocity of 16 meters per second at right angles to the sheet. A current of air (room temperature) having a velocity of 16 meters per second was blown for 2 minutes against the sheet that emerged from the hot air oven, after which the dried prepolymer sheet became stripped from the endless belt at the end roll (outside diameter 200 mm, length 600 mm) part as the belt turned away in its travel about the roll. When the so obtained dried prepolymer was tested for its solubility in a 50% acetone-toluene solution (weight ratio 3:1), no insolubles were detected.

EXAMPLE 2

A prepolymer phase in a liquid state of fluidity and containing 20% by weight of isopropyl alcohol obtained by operating as in Example 1 was formed into a 1-mm-thick sheet as described therein, following which this sheet was dried for 4 minutes by passing through a 120° C. hot air oven. When the sheet that emerged from the hot air oven was cooled with a water-cooled roll (outside diameter 200 mm, length 600 mm, coolant water) surface, cracks were formed at the cooled surface, and the sheet became stripped from the belt conveyor at the time the latter turned away in its travel about the roll. When the so obtained prepolymer in a solid state was tested for its solubility in a 50% acetone-toluene solution, it dissolved readily, and no insolubles were detected.

EXAMPLE 3

One hundred parts of an unreacted monomer-containing polymerization product solution containing 17% by weight of orthodiallyl phthalate prepolymer and 250 parts of isopropyl alcohol were combined, after which the combined solution was extracted for 5 minutes at 40° C. while stirring the solution at 200 rpm. Immediately on stopping the stirring the extraction system separated into two liquid phases. After removing the supernatant liquid by decantation and filtration, 300 parts of isopropyl alcohol was added anew to the bottom phase extraction residue predominantly of a prepolymer, and the extraction was carried out again for 5 minutes at 60° C. Immediately on stopping the stirring and extraction system separated into two liquid phases (at this time the whole system was a free-flowing liquid). The bottom prepolymer phase in a liquid state of fluidity (isopropyl alcohol content 20% by weight) was withdrawn from the bottom and caused to flow between a pair of vertically disposed rolls, both of which had been preheated to 60° – 65° C. Then by operating as in Example 1 a uniform sheetlike material having a thickness of 1.0 mm and a width of 400 mm was formed. When this was dried under foaming conditions by passing it through a 140° C. hot air oven and causing hot air to flow against the sheet at right angles thereto at a velocity of 20 meters per second, it dried in 2 minutes. A current of air (room temperature) having a velocity of 20 meters per second was blown for 1.0 minute against the sheet that emerged from the hot air oven from the rear side of the belt at right angles to the sheet, after which the sheet readily stripped from the endless belt at the end roll (outside diameter 200 mm, length 600 mm) part as the belt turned away in its travel about the roll. When the so obtained prepolymer in a solid state was tested for its solubility in a 50% acetone-toluene solution, it dissolved readily, and no insolubles were detected.

EXAMPLE 4

One hundred parts of an unreacted monomer-containing polymerization product solution containing 25% of orthodiallyl phthalate prepolymer was combined with 500 parts of isopropyl alcohol. When the extraction of this solution was carried out for 5 minutes while stirring it at 200 rpm at room temperature, the prepolymer became a powder. After stopping the stirring and allowing the solution to stand still, the supernatant liquid was removed by decantation and filtration. This was followed by repeating the extraction with stirring by the addition anew of 500 parts of isopropyl alcohol and operating the extraction for 5 minutes, followed by removing the supernatant liquid by decantation and filtration as in the case of the first extraction. The extraction was then repeated for the third time by the addition anew of 250 parts of isopropyl alcohol, followed by filtration to obtain a powdery dry prepolymer containing 100% by weight of the extractant. When this powdery prepolymer was heated for 1 hour at 60° C., a prepolymer in a liquid state of fluidity was obtained, after which this was formed into a uniform sheetlike material having a thickness of 1.0 mm and a width of 400 mm by operating as in Example 1. This sheetlike material was received onto a belt conveyor and passed through a 100° C. hot air oven, where it was dried under foaming conditions by blowing a current of hot air against the sheet at right angles thereto for 6 minutes at a velocity of 16 meters per second. When the resulting prepolymer in a solid state obtained after cooling and stripping from the belt was tested fro its solubility in a 50% acetone-toluene solution, it dissolved readily, and no insolubles were detected.

EXAMPLE 5

One hundred parts of an unreacted monomer-containing polymerization product solution containing 25% of orthodiallyl phthalate prepolymer and as extractant 200 parts of methyl alcohol were combined, and the extraction of the combined solution was carried out for 2.5 minutes at 40° C. while stirring the solution at 200 rpm. Immediately on stopping the stirring the extraction system separated into two liquid phases. The supernatant liquid consisting predominantly of monomer and methyl alcohol was removed by decantation and filtration. 250 parts of methyl alcohol was then added anew to the bottom phase extraction residue predominantly of prepolymer, and the extraction was repeated with stirring for 5 minutes at 60° C. Immediately on stopping the stirring the extraction system separated into two liquid phases (at this time the whole system was a free-flowing liquid). The bottom phase prepolymer phase in a liquid state of fluidity (methyl alcohol content 22% by weight) was then withdrawn from the bottom and caused to flow into between a pair of vertically disposed rolls, both of which had been preheated to 55° – 60° C. The top roll (outside diameter 100 mm, length 600 mm) was securedidly, while the bottom roll (outside diameter 100 mm, length 600 mm) was driven by a belt. As a result of the passage of the prepolymer through this pair of rolls, it was formed into a sheetlike material, which was received onto a belt conveyor (a silicone rubber belt having a width of 500 mm and a length 12 meters; speed of belt 1.0 meter per minute) and passed through a 110° C. hot air oven (length 6 meters). The sheet was dried in this oven by heating the sheet for 4 minutes under foaming conditions by directing a current of hot air against the sheet at right angles thereto at a velocity of 20 meters per second. At the point where the sheet that had emerged from the hot air oven became 80° – 90° C., it was pulled upwards relatively of the surface of the belt conveyor at the speed of the conveyor (1.0 meter per minute) to strip the dried prepolymer sheet from the belt conveyor. The sheet was then cooled to room temperature and comminuted. When the prepolymer dried in this manner was tested for its solubility in a 50% acetone-toluene (weight ratio 3:1) solution, no insoluble were detected.

EXAMPLE 6

One hundred parts of an unreacted monomer-containing polymerization product solution containing 25% of orthodiallyl phthalate prepolymer and as extractant 400 parts of methanol were combined. When this solution was then extracted at room temperature for 5 minutes while stirring the solution at 300 rpm, the prepolymer became powdery. The stirring was stopped, and the extraction system was allowed to stand. The supernatant liquid was then removed by decantation and filtration. This was followed by the addition anew of 400 parts of methanol and the repetition of the extraction at room temperature for 5 minutes with stirring. On filtration of the extraction system, a powdery prepolymer containing 50% of extractant was obtained. When this powdery prepolymer was heated for 1 hour at 60° C., a prepolymer phase in a liquid state of fluidity was obtained, from which prepolymer phase was obtained a uniform sheetlike material having a thickness of 1.0 mm and a width of 400 mm by operating as in Example 1. The so obtained sheet was received onto a belt conveyor and passed through a 110° C. hot air oven where it was heat dried for 4 minutes under foaming conditions by blowing a current of hot air against it at right angles thereto at velocity of 20 meters per second. When the prepolymer in a solid state obtained after cooling and stripping it from the belt conveyor was tested for its solubility in a 50% acetone-toluene solution, it readily dissolved therein, and no insolubles were detected.

We claim:

1. In the process for obtaining prepolymers or precopolymers of diallyl phthalate in a solid state by submitting a polymerization product solution containing a prepolymer or precopolymer of diallyl phthalate and the corresponding unreacted diallyl phthalate monomer to liquid phase extraction using as extractant a nonreactive organic solvent which is a solvent for the diallyl phthalate monomer but a nonsolvent for the prepolymer or precopolymer of diallyl phthalate to separate a prepolymer or precopolymer phase in a liquid state of fluidity and containing 10 – 30% by weight of the extractant based on the prepolymer or precopolymer phase and thereafter drying said prepolymer or precopolymer phase, the improvement which comprises forming said prepolymer or precopolymer phase in a liquid state of fluidity and containing the extractant into a sheetlike form prior to solidifying it by cooling, heating said phase under foaming conditions accompanied by the evaporation of the extractant, and thereafter solidifying said phase.

2. The process of claim 1 wherein the heating temperature is about 50° C to about 140° C.

3. The process of claim 1 wherein the thickness of the sheetlike prepolymer or precopolymer phase in a liquid state is not more than about three millimeters.

4. The process of claim 1 wherein said sheetlike prepolymer or precopolymer phase in a liquid state is supported atop a belt conveyor.

5. The process of claim 1 which comprises cooling said sheetlike prepolymer or precopolymer phase after its heat treatment.

* * * * *